United States Patent
Prenzel et al.

(10) Patent No.: US 9,163,168 B2
(45) Date of Patent: Oct. 20, 2015

(54) UV-CROSSLINKABLE PSAS WITH UV ABSORBER, METHODS FOR PRODUCING THEM AND USE

(71) Applicant: tesa SE, Hamburg (DE)

(72) Inventors: Alexander Prenzel, Hamburg (DE); Stephan Zöllner, Buchholz/Nordheide (DE); Michael Siebert, Schenefeld (DE)

(73) Assignee: TESA SE, Hamburg (DE)

( * ) Notice: Subject to any disclaimer, the term of this patent is extended or adjusted under 35 U.S.C. 154(b) by 0 days.

(21) Appl. No.: 14/103,263

(22) Filed: Dec. 11, 2013

(65) Prior Publication Data

US 2014/0179820 A1  Jun. 26, 2014

(30) Foreign Application Priority Data

Dec. 11, 2012  (DE) .......................... 10 2012 222 813

(51) Int. Cl.
| | |
|---|---|
| C08F 2/46 | (2006.01) |
| C08F 2/50 | (2006.01) |
| B29C 71/04 | (2006.01) |
| C08G 61/04 | (2006.01) |
| C09J 133/08 | (2006.01) |
| C09J 133/10 | (2006.01) |
| C08L 33/08 | (2006.01) |
| C08L 33/10 | (2006.01) |

(52) U.S. Cl.
CPC .............. *C09J 133/08* (2013.01); *C08L 33/08* (2013.01); *C08L 33/10* (2013.01); *C09J 133/10* (2013.01); *C08L 2312/06* (2013.01)

(58) Field of Classification Search
CPC ......... C09J 133/08; C09J 13/10; C08L 33/08; C08L 33/10; C08L 2312/06
USPC .............. 522/35, 33, 6, 1, 71, 189, 184; 520/1
See application file for complete search history.

(56) References Cited

U.S. PATENT DOCUMENTS

| | | | |
|---|---|---|---|
| 4,042,768 A | | 8/1977 | Muller et al. |
| 5,128,386 A | * | 7/1992 | Rehmer et al. .................. 522/35 |
| 5,223,645 A | | 6/1993 | Barwich et al. |
| 2001/0024699 A1 | * | 9/2001 | Fink et al. ...................... 427/516 |
| 2004/0167262 A1 | * | 8/2004 | Fink et al. ...................... 524/384 |
| 2005/0239916 A1 | | 10/2005 | Day et al. |
| 2007/0264497 A1 | * | 11/2007 | Kong ....................... 428/355 AC |
| 2008/0306201 A1 | | 12/2008 | Beltrame et al. |
| 2012/0016079 A1 | | 1/2012 | Weiskopf et al. |
| 2012/0172482 A1 | | 7/2012 | Ha et al. |

FOREIGN PATENT DOCUMENTS

| | | |
|---|---|---|
| DE | 2411169 | 9/1974 |
| DE | 3844444 A1 | 8/1990 |
| DE | 4037079 A1 | 5/1992 |
| DE | 69924506 T2 | 2/2006 |
| EP | 0246848 A2 | 11/1987 |
| EP | 0346734 A2 | 6/1989 |
| EP | 0377199 A2 | 7/1990 |
| EP | 1112330 B1 | 7/2001 |
| WO | 2010112505 A1 | 10/2010 |

OTHER PUBLICATIONS

European Search Report for 13195561.9 dated Apr. 24, 2014.
German Search report for DE 10 2012 222 813.6 dated Jul. 11, 2013.
P.E. Hinkamp, "Communication—A Table of Fikentscher K Values versus Relative Viscosities for a Concentration of 1.0", pp. 381-384, Plastics Production Research Service, Midland, Michigan.

* cited by examiner

*Primary Examiner* — Ling Choi
*Assistant Examiner* — Jessica E Whiteley
(74) *Attorney, Agent, or Firm* — Norris McLaughlin & Marcus PA

(57) ABSTRACT

The invention provides meltable and UV-crosslinkable pressure-sensitive adhesives, such as acrylate hotmelts or hotmelt formulations, which can be processed by commonplace hotmelt processes and also on customary hotmelt coating lines, without any immediate alteration in the product properties in the event of (unwanted) deviation in the operational parameters. The compositions of the invention are UV-crosslinkable and meltable pressure-sensitive adhesives comprising (i) mixtures of UV-crosslinkable polyacrylate polymers selected from a) mixtures of UV-crosslinkable polymers with at least one photoinitiator bonded covalently to the backbone of the polymers, and b) mixtures of UV-crosslinkable polyacrylate polymers, monomers and at least one photoinitiator, and also (ii) at least one UV stabilizer, and also methods for producing them and the use thereof as bonding agents.

17 Claims, 3 Drawing Sheets

UV-CROSSLINKABLE PSAS WITH UV ABSORBER, METHODS FOR PRODUCING THEM AND USE

This application claims priority to the German patent application DE 10 2012 222 813.6 filed Dec. 11, 2012.

The invention provides meltable and UV-crosslinkable pressure-sensitive adhesives, such as acrylate hotmelts or hotmelt formulations, which can be processed by commonplace hotmelt processes and also on customary hotmelt coating lines, without any immediate alteration in the product properties in the event of (unwanted) deviation in the operational parameters. The compositions of the invention are UV-crosslinkable and meltable pressure-sensitive adhesives comprising (i) mixtures of UV-crosslinkable polyacrylate polymers selected from a) mixtures of UV-crosslinkable polymers with at least one photoinitiator bonded covalently to the backbone of the polymers, and b) mixtures of UV-crosslinkable polyacrylate polymers, monomers and at least one photoinitiator, and also (ii) at least one UV stabilizer, and also methods for producing them and the use thereof as bonding agents.

Polymers crosslinkable by UV light and their use as adhesives, such as pressure-sensitive hotmelt adhesives, are known for example from DE-A-24 11 169, EP-A-246 848, DE-A-40 37 079 or DE-A-38 44 444.

For hotmelt adhesives, polymers are used which are solid at room temperature and which at higher temperatures can be applied from the melt to the desired substrates.

It is customary in this context for the required polymers to be supplied already in the fluid state, in tanker lorries, for example, and to be held in the fluid state until later processing. At the elevated temperatures required, therefore, there may be instances of thermally induced crosslinking, which are partly inhibited or prevented by addition of effective thermal stabilizers with respect to thermal crosslinking reactions. This is described for example in US 2001 024 699 A1 and US 2004 167 262 A1. The stabilizers must in particular not adversely affect the performance properties in the context of the later use as adhesives.

Found to be particularly problematic have been UV-crosslinkable polymers which for the purpose of later UV crosslinking include a photoinitiator, since the stabilizers used may impair the activity of the photoinitiator and so lead to adverse crosslinking and to adverse performance properties, an example being deficient cohesion in the layer of adhesive.

In order to prevent premature reaction of the photoinitiator, it is necessary, in addition to the stabilization with respect to thermal reactions, for both the transport and the processing of the UV-crosslinkable polyacrylate to be carried out in such a way that as far as possible the reactive polymer or reactive mixture is not subject to any direct or indirect light exposure as a result, for example, of insolation or other radiation sources. This is particularly difficult immediately after melt application and before the defined UV crosslinking in the hotmelt coating unit. Additional stabilization through UV absorbers and/or inhibitors prior to processing, however, would not be practised by the skilled person, who would expect this to lead to impairment of UV crosslinking.

In addition to the problems identified above with regard to the stabilization of the UV-crosslinkable polymers or of mixtures or formulations which comprise such UV-crosslinkable polymers, such systems also have a further problem, this being the stable and targeted adjustment of the desired product properties with regard to the processing regime. Indeed, the higher the effect of the UV dose on the product properties, the more difficult it is to compensate deviations from the desired processing regime, to ensure that the products are manufactured in line with specification. An unwanted alteration of the operating parameters results inevitably, for example, from the power of the UV lamps, which falls with increasing lifetime and wear. The result is a continually changing UV dose, which, in the absence of measures to control it, also results in an altered degree of crosslinking. Another influencing factor is the precise speed of the coating line at which the meltable pressure-sensitive adhesive is conveyed past the radiation source. Both influencing factors may change continuously or constantly. In order to combat them, it would be necessary for calibration to take place at very short and regular intervals, to allow the pressure-sensitive adhesive properties of the UV-crosslinked bonding agents to be kept constant only within a very narrow range.

The selection of commercially available, UV-crosslinkable polymers, more particularly polyacrylates, is confined to two groups.

The first comprises polymers to whose backbone the photoinitiators are bonded. With systems of this kind specifically there are no degrees of freedom for the photoinitiator concentration, and the processing window is a narrow ledge between undercrosslinking (cohesive failure) and overcrosslinking (excessive loss of adhesion) in the case of adhesives. As operational parameters, in addition to the setting of the UV dose, it would be necessary to adapt the coating line or the general processing operation to the polymer, in order to obtain the desired product properties. These measures are very costly and inconvenient, and in some cases are unimplementable or undesirable. Consequently there is a high demand for pressure-sensitive adhesives (PSAs) of this kind which avoid the stated measures or which permit more constant product properties to be stably maintained in spite of slight fluctuations in operational parameters.

The second group comprises polymers which are blended with photoinitiators that are not polymer-bound. To increase the effectiveness of crosslinking and therefore the cohesion, reactive diluents are frequently employed. These are monomers tailored to the mechanism of UV crosslinking that can additionally be used to set viscosity and hence to lower the processing temperature in the course of melt processing. Disadvantages here are that such systems are frequently used as "ready-to-coat" compositions and that the concentration of the reactive diluent must frequently be tailored to the photoinitiator concentration (or vice versa) in order to give the desired product properties. While different profiles of properties may be obtained by blending of the formulations with further photoinitiators and/or reactive diluents by the user, besides varying the UV dose, a fairly accurate knowledge of the formulation, and a considerable experimental effort, are nevertheless required in order first actually to improve the formula already optimized by the manufacturer, and second, additionally, to be certain that all of the reagents or additives additionally added do not trigger any adverse interactions.

The object of the invention was to provide UV-crosslinkable and meltable PSAs, such as acrylate hotmelts and hotmelt formulations, which can be processed both according to commonplace hotmelt processes and on commonplace hotmelt coating lines. The processing operation for these adhesives ought at the same time to be sufficiently stable that (unintended) deviations from the operational parameters or from the processing regime do not lead immediately to any change in the desired product properties. An object of the invention, therefore, was to develop compositions which are less sensitive to over- or undercrosslinking during the customary handling and processing to form PSAs. Such compositions enhance both the quality and reproducibility of the processes, and make them more economic.

Another object of the invention was to provide a method for producing the PSAs, a method for their processing, and the production of bonding agents, such as adhesive tapes, labels or adhesive transfer tapes.

Surprisingly, and not obviously to the skilled person, it has been found that the processing window for stable processing of UV-crosslinkable polymers or formulations comprising at least one UV-crosslinkable polymer, more particularly of UV-crosslinkable polyacrylates or of formulations comprising at least one UV-crosslinkable polyacrylate, can be targetedly adjusted or enlarged through the additional use of at least one UV stabilizer from the group of the UV absorbers and/or inhibitors, without adverse effect on the product properties of the crosslinked PSA.

The invention provides a composition comprising a water-free and solvent-free polyacrylate, to be processed from the melt, and a stabilizer from the group of the UV absorbers and/or inhibitors, a method for producing a meltable and UV-crosslinkable pressure-sensitive adhesive, and also a meltable, UV-crosslinkable pressure-sensitive adhesive comprising at least one UV-crosslinkable polyacrylate and at least one UV stabilizer from the group of UV absorbers and/or inhibitors.

The invention further encompasses the use of UV-crosslinkable, meltable pressure-sensitive adhesives comprising at least one UV stabilizer from the group of UV absorbers and/or inhibitors for producing cable wrapping tapes, and also the production of single-sided or double-sided adhesive tapes and labels, this recitation being only exemplary and not conclusive.

Also surprisingly it has been found that the product properties of the UV-crosslinkable and meltable pressure-sensitive adhesives are additionally adjustable by varying the UV dose, but that the properties can be set much more stably and are influenced hardly at all by unintended changes or deviations in the operational parameters or the processing regime. As a measure for this it is possible, among other parameters, to determine the dose dependency of the respective variable, such as bond strength, gel index, elastic fraction (measured by means of microshear travel) and holding powers, for example. The lower the slope, the more robust the method is with respect to (unintended) operational fluctuations, and the more stable are the product properties. The compositions of the invention react less sensitively to fluctuations in the UV dose, as is demonstrated below with the examples.

The invention provides a composition which is a UV-crosslinkable and meltable pressure-sensitive adhesive and comprises
(i) mixtures of UV-crosslinkable polyacrylate polymers, selected from
a) mixtures of UV-crosslinkable polymers with at least one photoinitiator bonded covalently to the backbone of the polymers and
b) mixtures of UV-crosslinkable polyacrylate polymers, monomers and at least one photoinitiator, and
(ii) at least one UV stabilizer.

The UV stabilizer is preferably selected from a UV absorber, more particularly an organic compound which forms a tautomeric structure under UV induction, or an inorganic UV absorber, preferably a nanoscale metal oxide, such as titanium oxide, or a UV inhibitor, which more particularly comprises at least one radical scavenger. Alternatively the UV stabilizer may also be a mixture comprising at least one UV absorber and one UV inhibitor. In the case of the development of tautomeric structures, with many organic UV absorbers, such as the compounds with 1,3- or 1,4-hydroxyl group and imine group or 1,3-hydroxyl and carbonyl group substitution, intramolecular hydrogen bonds are formed or acquire partially ionic character. A known phenomenon is the H shift in six-membered intramolecular hydrogen bonds of tautomeric structures.

The processing window for the meltable and UV-crosslinkable pressure-sensitive adhesive to be processed can be expanded to particularly good effect, with substantially constant technical adhesive properties, if the UV stabilizer is present in the composition with a defined concentration which is tuned to the concentration of the photoinitiator in dependence on the ratio of the absorption maxima. In this case it has been found that the concentration must be set in relation to the photoinitiator in accordance with the formulae below.

It has additionally been found, surprisingly, that the object is achieved to particularly outstanding effect if the concentration of the UV stabilizer from the group of UV absorbers and/or inhibitors is tuned to the concentration of the photoinitiator, in which case there are two different scenarios: I) The absorption maximum of the UV stabilizer is virtually identical to that of the photoinitiator, with the wavelengths of the absorption maxima differing by less than 50 nm and hence the overlapping of the two spectral absorption ranges being very great (formula 1). The formula applies both to polymer-bound photoinitiators and to photoinitiators present freely in the polymer. The alternative scenario is II), when the absorption maximum of the UV stabilizer does not coincide with that of the photoinitiator, and the wavelengths of the absorption maxima differ by at least 50 nm and hence the overlapping of the two spectral absorption ranges is small (formula 2). This formula likewise applies both to polymer-bound photoinitiators and to photoinitiators present freely in the polymer.

The invention accordingly provides, preferably, compositions in which the UV stabilizer is present in the composition with a defined concentration which is harmonized with the concentration of the photoinitiator and is dependent on the ratio of the absorption maxima according to formulae 1 and 2 below, which are each applied subject to conditions I) and II), the UV stabilizer being selected more particularly from the group of UV absorbers and/or inhibitors:

I) the wavelength of the absorption maximum of the UV stabilizer and of the photoinitiator are different by plus/minus less than or equal to 50 nm, more particularly by plus/minus less than 50 nm, preferably by plus/minus less than or equal to 49 nm, more preferably plus/minus less than 20 nm or less than or equal to 19 nm, $$0.01 \leq \frac{c_{UV-Stabilizer}}{c_{photoinitiator}} \leq 0.25, \tag{1}$$

where c is the concentration of the respective substance in mol/100 g polymer, or II) the wavelength of the absorption maximum of the UV stabilizer and of the photoinitiator are different by plus/minus greater than or equal to 50 nm, preferably plus/minus greater than or equal to 51 nm, more preferably plus/minus greater than or equal to 55 nm, with further preference 60 nm, $$0.05 \leq \frac{c_{UV-stabilizer}}{c_{photoinitiator}} \leq 0.55, \qquad (2)$$

where c is the concentration of the respective substance in mol/100 g polymer. The formulae stated above apply not only to the polymer-bonded photoinitiators but also to the photoinitiators present in the polymer, with the concentration being based on the amount of the photoinitiator, in mols, in the polymer or on the amount of covalently bonded groups of a photoinitiator (photoinitiator groups), in mols, on the polymer backbone. Surprisingly, the alternative validity of both formulae 1 and 2 has been found for the special case in which the wavelengths of the absorption maximum of the UV stabilizer and of the photoinitiator differ by 50 nm.

In accordance with the definition above, for the purpose of accelerating the UV crosslinking, the polyacrylate crosslinkable with UV light comprises a photoinitiator, which may have been added to the polymer or bonded covalently to the polyacrylate. Through irradiation with high-energy light, more particularly UV light, the photoinitiator brings about crosslinking of the polymers, preferably by means of a chemical grafting reaction of the photoinitiator with a spatially adjacent polymer chain. Crosslinking may take place more particularly by insertion of a carbonyl group of the photoinitiator into an adjacent C—H bond, with formation of a —C—C—O—H moiety.

The composition of the invention is more particularly a meltable and UV-crosslinkable pressure-sensitive adhesive, and with particular preference comprises a polyacrylate as crosslinkable polymer. In that case use is made preferably of polyacrylates with intrinsic pressure-sensitive adhesive tack. The use of further tackifiers, therefore, is preferably confined to special-purpose applications. With particular preference the composition comprises UV-crosslinkable polyacrylate polymers which comprise polymers of the esters of acrylic acid and/or of methacrylic acid. These polymers are essentially in the form of esters of acrylic acid or methacrylic acid. The UV-crosslinkable polyacrylate polymers further encompass acrylate-based hybrid systems comprising polyester-polyether hybrids, such as polyester-polyether-based urethane acrylates or polyester-polyether-based esterified acrylates, for example.

Furthermore, the composition, as polyacrylate polymers, may also comprise copolymers of (a) monomeric acrylates or methacrylates or prepolymers of acrylates or methacrylates, more particularly the esters, in each case independently with further (b) radically polymerizable monomers, prepolymers and/or polymers, with these (b) monomers preferably comprising no monomers defined under (a). The radically polymerizable monomers (b) preferably comprise, in each case independently, selected from b.1 to b.6:

(b.1) acrylates selected from linear, branched and cyclic alkyl (meth)acrylates, comprising 1 to 18 C atoms and functionalized with alkyl groups, preferably linear or cyclic C1 to C10 alkyl (meth)acrylates, acrylic acid and/or methacrylic acid, (b.2) vinyl-substituted polymerizable monomers, prepolymers and/or polymers, more particularly vinyl propionate, unsubstituted or mono- or disubstituted acrylamide, ethylenically unsaturated nitriles, vinyl halides or vinyl ethers, where not defined under (b.5), (b.3) hydrocarbons having two olefinic double bonds, such as butadiene, isoprene and chloroprene, (b.4) monomers or prepolymers having at least one unsaturated, radically polymerizable group and at least one carboxylic, sulphonic or phosphonic acid group, preference being given, according to one alternative, to monomers having at least two carboxylic acid groups, more preferably beta-acryloyloxypropanoic acid, itaconic acid, maleic acid, fumaric acid, with acrylic acid and methacrylic acid being encompassed by b.1, (b.5) monomers or prepolymers having at least one unsaturated, radically polymerizable group and at least one hydroxyl group, more particularly C1 to C10 hydroxyalkyl (meth)acrylates, mono- or disubstituted (meth)acrylamide, (b.6) monomers or prepolymers having at least one unsaturated, radically polymerizable group, more particularly at least one double bond, and at least one further functional group selected from isocyanate, amino, amide, ether, polyether and glycidyl groups, more particularly adhesion-promoting monomers, preferably phenyloxyethyl glycol mono(meth)acrylate, glycidyl (meth)acrylate, amino (meth)acrylates such as 2-aminoethyl (meth)acrylate, mono- or disubstituted (meth)acrylamide, where not included under b.2, where as (b), in each case independently, one or more radically polymerizable monomers, prepolymers and/or polymers or mixtures thereof are selected. The monomers defined under (a) preferably comprise no alkyl methacrylates, alkyl acrylates or esters of alkyl (meth)acrylates, or alkyl acrylates with C2 to C18 alkyl, which are collated under (b).

Likewise in accordance with the invention are compositions which comprise acrylate-based hybrid systems, examples being those described in US 2005 239 916 A1. These are UV-crosslinkable, polyester-polyether-based urethane acrylates and polyester-polyether-based esterified acrylates. The particularly preferred polyacrylate is a polymer which is obtainable by radical polymerization of acrylic monomers, a term which is understood to include methacrylic monomers, and optionally of further, copolymerizable monomers.

US 2001 024 699 A1 as well discloses meltable and UV-crosslinkable polyacrylate polymers that can be used in accordance with the invention. The polymers disclosed therein are incorporated fully by reference and made part of the disclosure content of the present specification. With particular preference the polyacrylate polymers disclosed therein with a covalently bonded photoinitiator can be used in the compositions.

Likewise provided by the invention are compositions of UV-crosslinkable polyacrylate polymers which comprise copolymers of (a) monomeric acrylates or methacrylates or prepolymers of acrylates or methacrylates, in each case independently, with other (b.1) acrylates, the (b.1) acrylates being selected from linear, branched or cyclic alkyl groups, comprising 1 to 18 C atoms, of alkyl (meth)acrylates, and the polyacrylate being based, to an extent of greater than or equal to 40 wt. % to 100 wt. % of the polyacrylate, on C1-C18 alkyl (meth)acrylates. More preferably the polyacrylate is constructed to an extent of at least 60 wt. %, very preferably at least 80 wt. %, of C1-C18 alkyl (meth)acrylates.

The alkyl (meth)acrylates comprise preferably aliphatic and cycloaliphatic C1-C10 alkyl (meth)acrylates, e.g. methyl (meth)acrylate, ethyl (meth)acrylate, n-butyl (meth)acrylate, 2-ethylhexyl (meth)acrylate, isooctyl (meth)acrylate, isobornyl (meth)acrylate.

Other (b) monomers of which the polyacrylate may be constructed are, for example, (b.2) vinyl esters of carboxylic acids containing up to 20 C atoms, vinylaromatics having up to 20 C atoms, ethylenically unsaturated nitriles, vinyl halides, vinyl ethers of alcohols containing 1 to 10 C atoms, aliphatic hydrocarbons having 2 to 8 C atoms and 1 or 2 double bonds, or mixtures of these monomers. Vinylaromatic compounds contemplated include, for example, vinyltoluene, α- and p-methylstyrene, α-butylstyrene, 4-n-butylstyrene, 4-n-decylstyrene and, preferably, styrene. Examples of nitriles are acrylonitrile and methacrylonitrile. The vinyl halides are ethylenically unsaturated compounds substituted by chlorine, fluorine or bromine, preferably vinyl chloride and vinylidene chloride. Examples of vinyl ethers include vinyl methyl ether or vinyl isobutyl ether. Preferred vinyl ethers are those of alcohols containing 1 to 4 C atoms.

Preferred (b.3) hydrocarbons having 2 to 8 C atoms and two olefinic double bonds are butadiene, isoprene and chloroprene.

Contemplated especially as monomers (b.4) are monomers having carboxylic, sulphonic or phosphonic acid groups, with monomers having carboxylic acid groups being preferred. Particularly preferred monomers are, for example, acrylic acid, β-acryloyloxypropanoic acid, itaconic acid, maleic acid or fumaric acid. Acrylic acid and methacrylic acid may likewise be preferred, if not already used as (b.1).

Other monomers are, for example, the (b.5) monomers containing hydroxyl groups, especially C1-C10 hydroxyalkyl (meth)acrylates, and also unsubstituted, and mono- and disubstituted (meth)acrylamide.

Monomers additionally preferred (b.6) are phenyloxyethyl glycol mono(meth)acrylate, glycidyl (meth)acrylate, amino (meth)acrylates such as 2-aminoethyl (meth)acrylate. And there are further monomers which as well as the double bond also carry other functional groups in order, for example, to achieve a further improvement in the adhesion; they comprise, preferably, isocyanate, amino, hydroxyl, amide or glycidyl groups.

UV-crosslinkable PSAs in accordance with the composition of the invention comprise more preferably UV-crosslinkable copolymers derived from (a) esters of monomeric acrylates or methyacrylates or prepolymers of acrylate esters or methacrylate esters and also, in each case independently, from at least one or more other radically polymerizable monomers, prepolymers and/or polymers selected from (b.1) to (b.6).

The compositions of the invention preferably have less than or equal to 2 parts by weight to 0.0001 part by weight of an organic solvent and/or water per 100 parts by weight of polyacrylate, the solvent being deemed to comprise typical organic solvents, such as ethers, esters, ketones, alcohols, dichloromethane, THF, acetone, etc. Not deemed as solvents are monomers of the polyacrylates.

Preferred UV stabilizers are selected from 1. organic UV absorbers which on induction by UV radiation form tautomeric structures, or inorganic UV absorbers, and 2. radical scavengers as UV inhibitors.

There is also preferably 0.0001 to 1 mol, more preferably 0.0002 to 0.1 mol, very preferably 0.0003 to 0.01 mol of the photoinitiator or of the moiety effective as photoinitiator and bonded to the polymer backbone in the composition per 100 g of polyacrylate.

Preferred organic UV absorbers comprise 2-hydroxyphenyl derivatives, oxalanilide derivatives, acrylic acid derivatives with aromatic substitution at C-3, such as cinnamic acid derivatives, urocanic acid (imidazole-4-acrylic acid), organic nickel complexes or umbelliferone, and the inorganic UV absorbers comprise preferably metal oxides, more particularly of titanium and zinc, such as titanium dioxide, zinc oxide or else iron oxide, more particularly non-pigmentary metal oxides, such as non-pigmentary titanium dioxide, iron oxide pigments and zinc oxide, preference being given to nanoscale $TiO_2$. Generally speaking it is possible to use all metal oxides with suitability as UV absorbers and derived from metals from the Periodic Table of the Elements. According to point 2., the UV inhibitors comprise alkyl-substituted hindered amines, more particularly 2,2,6,6-alkyl-substituted piperidine derivatives. Likewise in accordance with the invention it is possible to use combinations of different UV absorbers or else UV absorbers and UV inhibitors.

With further preference, organic UV absorbers comprise, as 2-hydroxyphenyl derivatives, 2-(2-hydroxyphenyl)-2H-benzotriazoles (BTZ, formula IIa), (2-hydroxyphenyl)-s-triazines (HPT, formula IIb), hydroxybenzophenones (BP, formula IIc) and oxalanilides (formula IId) and also, in each case independently, their respective derivatives, examples being the acrylic acid derivatives with C-3 aromatic substitution, the phenyl-substituted cinnamic acid derivatives or urocanic acid (imidazole-4-acrylic acid). Preference is given to using the hydrogen-substituted compounds of IIa, IIb, IIc and/or IId, or their derivatives with at least partial substitution by alkyl groups.

A UV stabilizer generally comprises a compound having pronounced absorption capacity for ultraviolet radiation. UV stabilizers are used as light stabilizers (UV stabilizers) both for improving the light stability of coatings, plastics and rubbers (as ageing inhibitors), glasses (UV filters), packaging materials and other industrial products, and as sunscreens in cosmetic products. The UV absorbers function according to the principle of light absorption, with the amount of UV radiation absorbed being a function of the thickness of the transradiated body and of the stabilizer concentration. The absorbed energy is subsequently released again as thermal energy. As an intermediate stage, the organic UV stabilizers typically form a tautomeric structure, with the original structure being formed again after the thermal energy has been given up.

The most important and particularly preferred UV absorber classes for the purposes of the invention are 2-(2-hydroxyphenyl)-2H-benzotriazoles (BTZ, IIa), (2-hydroxyphenyl)-s-triazines (HPT, IIb), hydroxybenzophenones (BP, IIc) and oxalanilides (IId), and they differ inter alia in the breadth of the absorption (principally in the region of 290-400 nm).

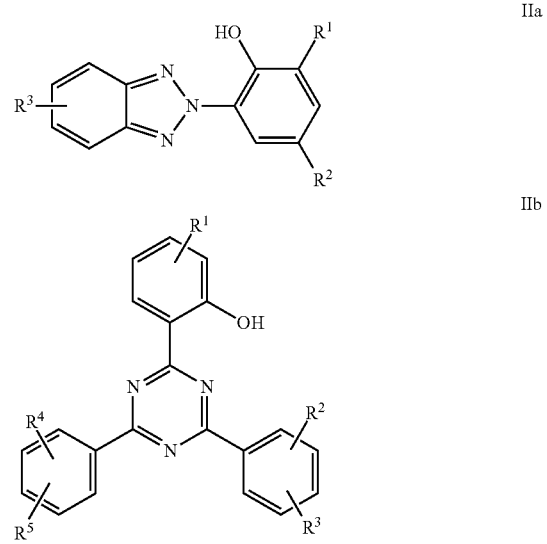

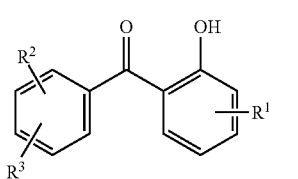

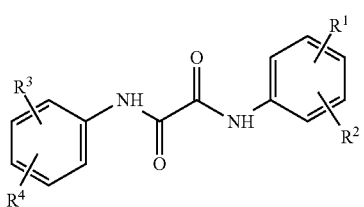

The radicals $R^1$, $R^2$, $R^3$, $R^4$ and/or $R^5$ in the formulae IIa, IIb, IIc and IId may in each case independently in formula IIa, IIb, IIc or IId correspond to a hydrogen or to an alkyl group, the alkyl group being linear, branched or cyclic and preferably being unsubstituted, and being able more preferably to encompass 1 to 20 C atoms.

Also active as UV absorbers and likewise preferred are acrylates with phenyl substitution in position 3 (cinnamic acid derivatives), optionally with cyano groups in position 2, salicylates, organic nickel complexes, and also natural substances such as umbelliferone and the endogenous urocanic acid.

The aforementioned UV inhibitors do not absorb UV radiation, but instead act as hydrogen donors at the site where the degradation takes place. In this process, a hydrogen atom is given up, for example, to a peroxide radical, with the inhibitor in this reaction forming a stable radical and thus acting like a radical scavenger. Inhibitors used are preferably those known as HALS (hindered amine light stabilizers), more preferably sterically hindered 2,2,6,6-alkyl-substituted piperidine derivatives.

The photoinitiators in the compositions comprise the customary ketones or diketones and derivatives thereof. Generally speaking, there is at least one photoinitiator or else a mixture of photoinitiators present in the composition. Accordingly the compositions of the UV-crosslinkable and meltable PSAs comprise at least one photoinitiator selected from (i.a) at least one photoinitiator which is present in the mixture and is selected from acetophenone, benzoin ethers, benzyl dialkyl ketols, benzophenone, benzil, thioxanthone, phenylglyoxylate, benzoylphosphinate, benzoylphosphine oxide, bisbenzoylphosphine oxide, α-amino ketone or derivatives thereof, or titanocene, bis[η⁵-2,4-cyclopentadien-1-yl)bis[2,6-difluoro-3-(1H-pyrrol-1-yl)phenyl]titanium, oxime esters, [1-(4-phenylsulphanylbenzoyl)heptylideneamino]benzoate and [1-[9-ethyl-6-(2-methylbenzoyl)carbazol-3-yl]ethylideneamino]acetate and derivatives thereof, or at least one photoinitiator according to (i.b), which is bonded covalently to the polymer backbone and is copolymerized into the polymer backbone by radical copolymerization of an ethylenically substituted linker-photoinitiator group, the photoinitiator group—also called molecular group—comprising a radical derived from acetophenone, benzoin ethers, benzyl dialkyl ketols, benzophenone, benzil, thioxanthone, phenylglyoxylate, benzoylphosphinate, benzoylphosphine oxide, bisbenzoylphosphine oxide, α-amino ketone or derivatives thereof, or titanocene, bis[η⁵-2,4-cyclopentadien-1-yl)bis[2,6-difluoro-3-(1H-pyrrol-1-yl)phenyl]titanium, oxime esters, [1-(4-phenylsulphanylbenzoyl)heptylideneamino]benzoate and [1-[9-ethyl-6-(2-methylbenzoyl)carbazol-3-yl]ethylideneamino]acetate and derivatives thereof. The ethylenic group is more particularly an acryloyl or methacryloyl group. The radical or the photoinitiator group derives preferably from an aforementioned photoinitiator, more particularly by substitution of a hydrogen or of an alkyl group. The radical or the photoinitiator group may further be bonded to the polymer backbone via the linker-photoinitiator group, which preferably comprises an acryloyl or methacryloyl group or else an alkyl group with a terminal vinyl group. In addition to the photoinitiator group, the linker-photoinitiator group preferably comprises a further 3 to 30 C atoms and, other than the fact that it may be based on an acryloyl or methacryloyl group and that it comprises the photoinitiator group, is unsubstituted. The aforementioned photoinitiator groups correspond in general to the aforementioned compounds or to the corresponding derivatives substituted purely by hydrogen and/or by alkyl groups.

The photoinitiator in the linker-photoinitiator group or molecular group is preferably bonded to the polyacrylate, more particularly by way of a linker group. Particularly preferred photoinitiators have been incorporated into the polymer chain by means of radical copolymerization. This is done using, preferably, photoinitiators having an acryloyl or methacryloyl group. Employed with particular preference as copolymerizable photoinitiators are acetophenone derivatives or benzophenone derivatives having at least one olefinic group, preferably an ethylenically unsaturated group, present preferably in the form of an acryloyl or methacryloyl group.

The ethylenically unsaturated group may be bonded directly to the phenyl ring of the acetophenone derivative or benzophenone derivative in the linker-photoinitiator group, customarily to the phenyl ring of the linkers with the ethylenically unsaturated group, more particularly the ethylenically unsaturated end group. This divalent linker between the phenyl ring and the ethylenically unsaturated group includes a spacer group having preferably 1 to 100 C atoms, more preferably 2 to 50, very preferably 2 to 10 C atoms.

Suitable acetophenone derivatives or benzophenone derivatives that can be used as photoinitiator or as linker-photoinitiator group are described for example in EP-A-346 734, EP-A-377 199, DE-A-40 37 079 and DE-A-38 44 444 and by virtue of this reference are also disclosed in the present specification. Preferred linker-photoinitiator groups comprise acetophenone derivatives and benzophenone derivatives of the general formula (I)

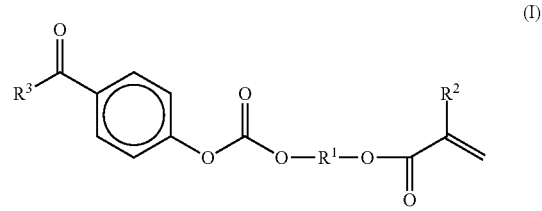

in which $R^1$ is an organic radical having 1 to 30 C atoms, more particularly 1 to 10 C atoms, alternatively 2 to 8 C atoms, $R^2$ is an H atom or a methyl group, and $R^3$ is an optionally substituted phenyl group or a C1-C4 alkyl group. More preferably $R^1$ is an alkylene group, more particularly a C2-C8 alkylene group. More preferably $R^3$ is a methyl group or a phenyl group.

Likewise preferred are photoinitiators which subsequent to the radical polymerization are bonded to the polymer by means of a polymer-analogous reaction. This procedure would correspond to grafting of the polymer or to subsequent functionalization of the polymer.

Preferred compositions of the invention comprise, in each case independently, based on 100 parts by weight of polyacrylate polymer:
- 0.0001 to 1 mol of photoinitiator per 100 parts by weight of polyacrylate polymer,
- 0 to 2 parts by weight of solvent, more particularly 0.0 to 1.0 part by weight of solvent, preferably 0.0 to 0.5 part by weight, more preferably 0.0 to 0.2 part by weight,
- 0.05 to 5 parts by weight of primary and/or secondary ageing inhibitors having a molecular weight of less than or equal to 1500 g/mol, polymeric ageing inhibitors comprising hydroxyl groups and optionally ether groups or having at least one phosphite group, and
- 0 to 80 parts by weight of tackifier resins, more particularly 0 to 45, alternatively 40 to 80 parts by weight, such as, for example, abietic esters, terpene-phenolic resins, C5 and C9 resins. Polyacrylate polymer used with preference here comprises copolymers of (a) monomeric acrylates or methacrylates or prepolymers of acrylates or methacrylates with other (b.1) acrylates selected from alkyl methacrylates having linear, branched or cyclic alkyl groups comprising 1 to 18 C atoms, the polyacrylate being based to an extent of greater than or equal to 80 wt. % to 100 wt. % on C1-C18 alkyl (meth)acrylate.

The polyacrylate preferably has a K value of 30 to 80, more preferably of 40 to 60, measured as a one percent strength (1 g/100 mL) toluenic polymer solution at 25° C. in a Vogel-Ossag viscometer. The K value by the method of Fikentscher is a measure of the molecular weight, which is determined by means of the kinematic viscosity of the polymer solution. Following standardization to the viscosity of the toluene, the relative viscosity is obtained, and can be used to calculate the K value by the method of Fikentscher (*Polymer* 1967, 8, 381).

The static glass transition temperature (Tg) of the polyacrylate is preferably −60 to +10° C., more preferably −55 to 0° C., very preferably −55 to −10° C. The glass transition temperature of the polyacrylate can be determined by customary methods such as differential thermal analysis or differential scanning calorimetry (see e.g. ASTM 3418/82, midpoint temperature).

The polyacrylates which are used in particular as meltable and UV-crosslinkable PSAs in the composition can be prepared by copolymerization of the monomeric components, using the customary polymerization initiators and also, optionally, chain transfer agents, with polymerization being carried out at the customary temperatures in bulk, in emulsion, such as in water or liquid hydrocarbons, for example, or in solution. The new copolymers are preferably prepared by polymerization of the monomers in solvents, more particularly in solvents with a boiling range of 50 to 150° C., preferably of 60 to 120° C., using the customary amount of polymerization initiators, which is generally 0.01 to 10 wt. %, more particularly 0.1 to 4 wt. %, based on the total weight of the monomers. Solvents that are suitable include, in particular, alcohols, such as methanol, ethanol, n- and isopropanol, n- and isobutanol, preferably isopropanol and/or isobutanol, and also hydrocarbons such as toluene and, in particular, benzines with a boiling range of 60 to 120° C. Use may also be made of ketones, such as acetone, methyl ethyl ketone and methyl isobutyl ketone, and esters, such as ethyl acetate, and also mixtures of solvents of the stated kind, with preference being given to mixtures containing isopropanol and/or isobutanol in amounts of 5 to 95, more particularly of 10 to 80, preferably of 25 to 60 wt. %, based on the solvent mixture employed.

Polymerization initiators contemplated for the solution polymerization include, for example, azo compounds, ketone peroxides and alkyl peroxides.

It is possible, furthermore, to carry out all kinds of controlled radical polymerization that are familiar to the skilled person, with an exemplary list including ATRP (atom transfer radical polymerization), RAFT (reversible addition fragmentation chain transfer polymerization) and SFRP (stable free radical polymerization, sometimes also called nitroxide-mediated polymerization).

After the polymerization in solution, the solvents may be separated off optionally under reduced pressure, working at elevated temperatures, in the range from 100 to 150° C., for example. The polymers can then be used in solvent-free state, i.e. as melts. In certain cases it is also advantageous for the new UV-crosslinkable polymers to be prepared by polymerization in bulk, i.e. without accompanying use of a solvent, in which case operation may take place batchwise or else continuously, in accordance with the details in U.S. Pat. No. 4,042,768.

The polyacrylates used in the composition of the invention are preferably solvent-free. The residual level of solvents, such as of organic solvents and/or water, for example, however, may amount to below 2 parts by weight, more particularly below 1 part by weight, more preferably below 0.5 part by weight, very preferably below 0.2 part by weight of solvent, based on 100 parts by weight of polyacrylate.

Besides the polyacrylate and the UV stabilizer from the group of the UV absorbers and/or inhibitors, the composition of the invention further preferably comprises at least one stabilizer to counter thermal reactions and ageing processes, from the group of the primary and/or secondary ageing inhibitors.

Primary ageing inhibitors of the invention comprise compounds which have at least one hydroxyl group bonded aromatically, more particularly bonded to a phenyl group, and which are constructed exclusively of hydrogen, carbon and oxygen atoms. In particular there may be 1 to 3 such hydroxyl groups present.

Preferred ageing inhibitors have a C1-C6 alkyl group, preferably a tert-butyl group, in both positions ortho to at least one of the aromatic hydroxyl groups.

Antioxidants of this kind are, for example, in particular those of the formula (III)

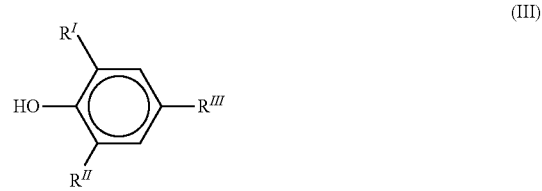

(III)

in which $R^I$, $R^{II}$ and $R^{III}$ independently of one another are a C1-6 alkyl group. More preferably $R^I$ and $R^{II}$ are a tertiary butyl group, and $R^{III}$ is a C1-C4 alkyl group; with very particular preference, $R^{III}$ is a methyl group. Particularly preferred is the compound with $R^I$ and $R^{II}$=tertiary butyl and $R^{III}$=methyl (available as Ralox® BHT from Raschig GmbH).

Additionally preferred are ageing inhibitors which include at least one ether group. There may, for example, be 1 to 6 ether groups present. Particularly suitable ether groups are alkoxy groups, more particularly C1-C4 alkoxy groups and very preferably methoxy groups. The alkoxy groups are preferably bonded directly to an aromatic ring system, more particularly to a phenyl group, more preferably to a phenyl group to which the above hydroxyl groups are also bonded.

Preferred antioxidants are therefore also chemical compounds of the following formula (IV)

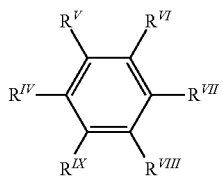

(IV)

in which at least one, preferably one, of the radicals $R^{IV}$ to $R^{IX}$ is a hydroxyl group and at least one, preferably one, of the radicals $R^{IV}$ to $R^{IX}$ is an ether group of the formula

—O—X or of the formula

—Y—O—X in which X is a monovalent hydrocarbon group, which may optionally be interrupted or substituted by hydroxyl groups, ester groups or further ether groups and has a molar weight of up to 1000 g/mol, and Y is a divalent hydrocarbon group which may optionally likewise be interrupted or substituted by hydroxyl groups, ester groups or further ether groups and has a molar weight of up to 500 g/mol, and the other radicals $R^{IV}$ to $R^{IX}$ independently of one another are a hydrogen atom or a C1 to C6 alkyl group.

A preferred case are ether groups of the formula —O—X, in which X is an alkyl group, more particularly a C1-C4 alkyl group, very preferably a methyl group; this corresponds, therefore, to an alkoxy group, more particularly methoxy group. In this case, in particular, only one of the radicals $R^{IV}$ to $R^{IX}$ is a hydroxyl group, one or two of the radicals are an alkoxy group, more particularly methoxy group, and the remaining radicals $R^{IV}$ to $R^{IX}$ independently of one another are a hydrogen atom or a C1 to C6 alkyl group, including, in particular, tert-butyl groups (preferably in ortho position to the hydroxyl group). Methoxyphenol may be given as an example.

A preferred case for ether groups —Y—O—X are ether groups in which Y is an alkylene group, more particularly a C2-C6 alkylene group, which is interrupted by an ester group, and X is an alkylaryl group, it being possible for the alkyl group likewise to be interrupted by ether groups or ester groups and for the aryl group to be substituted by hydroxyl groups or alkyl groups, more particularly C1-C6 alkyl groups. Examples thereof are Irganox® 245 and Irganox® 1076 from BASF, formerly Ciba Geigy.

Especially preferred ageing inhibitors are those which in addition to the aromatically bonded hydroxyl group contain an ether group and which at least for one of the aromatically bonded hydroxyl groups have two ortho-positioned C1-C6 alkyl, more particularly two tert-butyl groups, as substituents.

The ageing inhibitor is preferably a low molecular weight compound with a molecular weight of less than 1500 g/mol, more particularly less than 1000 g/mol. Also contemplated, however, are polymeric ageing inhibitors with corresponding hydroxyl groups and optionally ether groups.

Used as secondary ageing inhibitor is preferably one with at least one phosphite group $P(-O-)_3$. The ageing inhibitor preferably comprises one to three phosphite groups, more preferably one phosphite group.

The stabilizer is generally a low molecular weight compound having a molecular weight of less than 1500 g/mol, more particularly less than 1000 g/mol.

Preferably it is a compound of the formula (V)

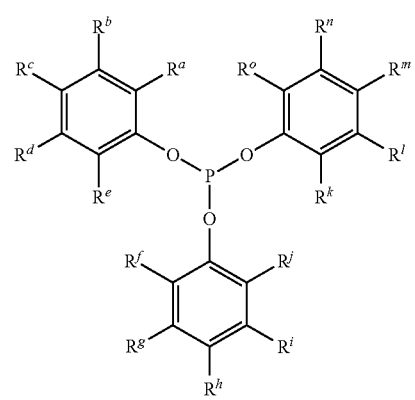

(V)

in which $R^a$ to $R^o$ independently of one another are an H atom or an organic group having up to 20 C atoms and optionally with heteroatoms such as O, N, Si or S.

Preferably on each phenyl ring at least three, more particularly three to four, of the respective radicals R stand for H atoms. Preferably one or two, more particularly one, of the radicals on each phenyl ring stands for an organic group having up to 20 C atoms.

The organic group as radical R may be, for example, an alkyl group, alkenoxy group or an alkylsiloxane group. Mention may be made of n-alkyl, isoalkyl and tert-alkyl groups, ethylene oxide, propylene oxide groups, linear and branched alkylsiloxanes, more particularly dimethylsiloxanes. Particularly preferred is an alkyl group, e.g. a C1-C20 alkyl group.

Mention may be made by way of example of a stabilizer in which $R^c$, $R^h$ and $R^m$ are a C9 alkyl group; one such stabilizer is available as Irgafos® TNPP from BASF, formerly Ciba Geigy.

It is also possible for different antioxidants to be used in a mixture. Customary primary ageing inhibitors act as C radical scavenger and are oxidized, such as the stated phenol derivatives. The secondary ageing inhibitors break down hydroperoxides that are formed as a result of autooxidation processes. Both ageing inhibitors, therefore, in contrast to the UV stabilizers, exhibit radical intermediates, at least on an intermediate basis.

The amount of primary and/or secondary ageing inhibitors in the composition is preferably 0.05 to 5 parts by weight, more preferably 0.1 to 2 parts by weight, very preferably 0.1 to 1 part by weight, based on 100 parts by weight of polyacrylate.

Besides the polyacrylate and the stabilizer from the group of the UV absorbers and/or inhibitors, the composition of the invention may optionally further comprise other additives, examples being tackifiers (tackifier resins), such as abietic esters, terpene-phenolic resins, C5 and C9 resins or plasticizers.

In accordance with a further embodiment, the invention comprises a method for producing a composition comprising a UV-crosslinkable and meltable pressure-sensitive adhesive, and also compositions obtainable by this method, which involve mixing (i) mixtures of UV-crosslinkable polyacrylate polymers, selected from (i.a) mixtures of UV-crosslinkable polymers with at least one photoinitiator bonded covalently to the backbone of the polymers, and (i.b) mixtures of UV-crosslinkable polyacrylate polymers, monomers and at least one photoinitiator, with (ii) at least one UV stabilizer.

The UV-crosslinkable polyacrylate polymers used in the method are preferably selected from aforementioned polyacrylate polymers of the esters of acrylic acid and/or of methacrylic acid, acrylate-based hybrid systems, comprising polyester-polyether hybrid systems, such as polyester-polyether-based urethane acrylates or polyester-polyether-based esterified acrylates, and also copolymers of (a) and (b), as defined above. A preferred UV-crosslinkable polyacrylate polymer may be based on the reaction of about 93 wt. % 2-ethylhexyl acrylate, 4 wt. % acrylic acid and 3 wt. % acrylonitrile.

Used in this context is a defined concentration of the at least one UV stabilizer, more particularly from the group of the UV absorbers and/or inhibitors, which is harmonized with the concentration of the photoinitiator and is dependent on the ratio of the absorption maxima according to formulae 1 and 2 stated above.

In accordance with a further embodiment, the invention provides a composition obtainable by the method, and also transfer adhesive produced therefrom, more particularly adhesive transfer tapes.

Further provided by the invention is the use of the composition for producing adhesive transfer tapes, sheets, coatings, coatings with defined dimensions, adhesive tape, single- or double-sidedly coated carriers, more particularly labels, carriers coated with the meltable pressure-sensitive adhesive, it being possible for the carriers to be made of the following materials: paper, textile carriers, films, nonwoven webs and woven fabrics, which more particularly may be made from plastics, such as polyesters, polyolefins or PVC. The basis weights of the carriers may lie between 20 to 250 g/m$^2$, conventional are 90 to 130 g/m$^2$.

The invention also provides for the use of the composition for producing a bonding agent, such as a transfer adhesive, an adhesive transfer tape or a coated carrier, more particularly adhesive tape, and also the bonding agents obtainable in this way, the meltable pressure-sensitive adhesive, as a melt in the temperature range from 60 to 200° C., being applied in the form of a uniform coating with a film thickness of 2 to 200 µm, optionally being applied to a carrier or to a transfer carrier, and the coating being crosslinked using high-energy radiation having a radiation energy between 10 to 150 mJ/cm$^2$, more particularly between 20 to 120 mJ/cm$^2$.

The flat bonding agents, more particularly in the form of a self-adhesive article, comprise a carrier coated with a composition, more particularly a carrier coated with a UV-crosslinkable or UV-crosslinked PSA composition, the flat bonding agent being selected from a label, adhesive tape, cable wrapping tape or protective sheet, or a flat transfer adhesive or an adhesive transfer tape. Particularly preferred adhesive tapes are suitable for wrapping cables and comprise a preferably textile carrier and, applied to at least one side of the carrier, a UV-crosslinkable, meltable PSA or a UV-crosslinked PSA of the invention.

Likewise provided by the invention is the use of an adhesive tape of the invention for jacketing elongate material, the adhesive tape being guided in a helical line around the elongate material, the elongate material more particularly being enveloped in axial direction by the tape, and also an elongate material, such as, more particularly, a cable harness, jacketed with an adhesive tape.

The compositions of the invention are suitable, therefore, for producing coatings, being suitable more particularly as hotmelt PSA and, correspondingly, for the production of hotmelt PSA coatings, on labels, adhesive tapes, films, nonwoven webs and woven fabrics, for example. The labels may be made, for example, of paper or of plastics such as polyesters, polyolefins or PVC. The adhesive tapes or films may likewise be made of the above plastics.

To produce the coatings, the compositions of the invention may be applied preferably in melt form to the substrates that are to be coated. For this purpose the composition is heated at 60 to 200° C., more particularly at 90 to 160° C., and so it is in melt form. The melt of the composition may optionally be stored or transported at high temperatures, as for example from 60 to 160° C., more particularly from 80 to 140° C., for several days, a week for example, without thermal crosslinking being found. Subsequently the composition may be applied as a melt, i.e. in general at temperatures of 80 to 160° C., to substrates or carriers, as specified above, for example.

The composition is applied preferably with a film thickness of 2 to 200 µm, more preferably of 5 to 150 µm, very preferably of 10 to 100 µm. The UV light-crosslinkable polyacrylates are subsequently crosslinked by irradiation with high-energy radiation, preferably UV light, at room temperature in particular.

Generally speaking for this purpose the coated substrates are placed on to a conveyor belt and the conveyor belt is conveyed past a radiation source, a UV lamp for example, preferably at a defined speed.

The degree of crosslinking of the polymers is dependent on the duration and intensity of the irradiation and also on the proportion of the concentration of the UV stabilizer of the invention, from the group of the UV absorbers and/or UV inhibitors, to the concentration of the photoinitiator. The radiation energy preferably amounts in total to 10 to 150 mJ/cm$^2$ irradiated surface area.

The cable wrapping tape utility is particularly preferred. The wire harnessing tapes must fulfil the following parameters, and are cable wrapping tapes based on woven-fabric, nonwoven-web or film carriers:

High temperature stability.

Very good flagging behaviour (quantifiable by the tesa TFT method) with minimal or controllable ARK (control of the BSRF for different carriers). In the wire harnessing sector, the Bond Strength to Reverse Face cannot be increased arbitrarily, since, for reasons of cost and application, the tape is always used without release paper, being thus wound on to itself.

Good flow onto a variety of substrates (e.g. X-PE or ETFE cable jackets, but also convoluted tubes).

In spite of the presence of the UV stabilizer from the group of UV absorbers and/or inhibitors, the polyacrylates remain readily crosslinkable by UV light, especially when the inventive ratio is set between UV stabilizer and photoinitiator.

EXAMPLE SECTION

Figure 1:
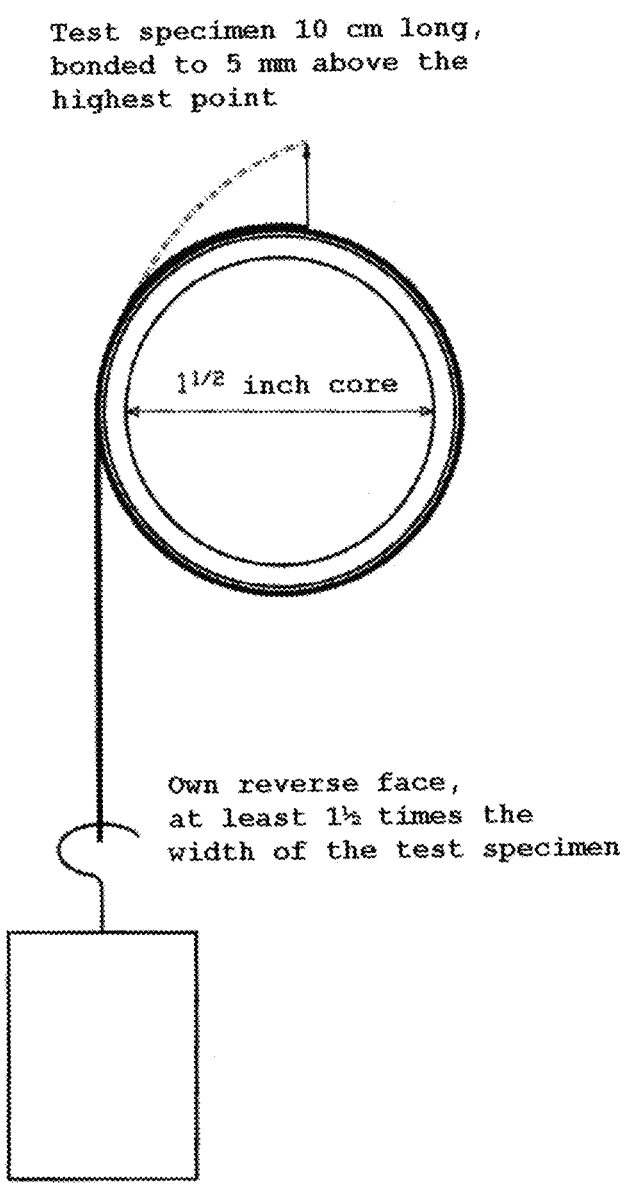
FIG. 1 shows a measurement of flagging resistance to LV312 or TFT method.

The following exemplary experiments are intended to elucidate the invention in more detail, without the invention being confined to the examples shown.

Measurement Methods (General):

Implementation of the tests: The measurements—unless expressly mentioned otherwise—are carried out under test conditions of 23±1° C. and 50±5% relative humidity.

K Value (According to Fikentscher) (Measurement Method A1): The K value is a measure of the average molecular size of high-polymer substances. For the measurement, one percent strength (1 g/100 mL) toluenic polymer solutions were prepared and their kinematic viscosities were determined by means of a Vogel-Ossag viscometer. Following standardization to the viscosity of the toluene, the relative viscosity is obtained, and can be used to calculate the K value by the method of Fikentscher (*Polymer* 1967, 8, 381 ff.).

Measurement Methods (Especially PSAs):

180° Bond Strength Test (Measurement Method H1): A strip 20 mm wide of acrylate PSA applied as a layer to polyester was applied to steel plates which had been washed beforehand twice with acetone and once with isopropanol. The adhesive strip was pressed on to the substrate twice with an applied pressure corresponding to a weight of 2 kg. The adhesive tape was then immediately peeled from the substrate at a speed of 300 mm/min and at an angle of 180°. All measurements were conducted at room temperature.

The results are reported in N/cm and are averaged from three measurements. The bond strength to polyethylene (PE) was determined analogously.

Holding Power (Measurement Method H2):

A strip of the adhesive tape 13 mm wide and more than 20 mm long (30 mm, for example) was applied to a smooth steel surface which had been cleaned three times with acetone and once with isopropanol. The bond area was 20 mm·13 mm (length·width), with the adhesive tape protruding beyond the edge of the test plate (by 10 mm, for example, corresponding to the 30 mm length indicated above). Thereafter the adhesive tape was pressed on to the steel substrate four times, with an applied pressure corresponding to a weight of 2 kg. This sample was suspended vertically, with the protruding end of the adhesive tape pointing downwards.

At room temperature a weight of 1 kg was affixed to the protruding end of the adhesive tape. Measurement is carried out under standard conditions (23° C., 55% humidity) and at 70° C. in a thermal cabinet.

The holding power measured (time taken for the adhesive tape to detach fully from the substrate; measurement discontinued at 10 000 min) is reported in minutes and corresponds to the average value from three measurements.

Microshear Test (Measurement Method H3)

This test is used for accelerated testing of the shear strength of adhesive tapes under temperature load.

Sample Preparation for Microshear Test:

An adhesive tape (length about 50 mm, width 10 mm) cut from the respective sample specimen is adhered to a steel test plate which has been cleaned with acetone, in such a way that the steel plate protrudes beyond the adhesive tape to the right and the left, and that the adhesive tape protrudes beyond the test plate by 2 mm at the top edge. The bond area of the sample in terms of height·width=13 mm·10 mm. The bond site is subsequently rolled over six times with a 2 kg steel roller at a speed of 10 m/min. The adhesive tape is reinforced flush with a stable adhesive strip which serves as a support for the travel sensor. The sample is suspended vertically by means of the test plate.

Microshear Test:

The sample specimen for measurement is loaded at the bottom end with a weight of 100 g. The test temperature is 40° C., the test duration 30 minutes (15 minutes' loading and 15 minutes' unloading). The shear travel after the predetermined test duration at constant temperature is reported as the result in μm, both as the maximum value ["max"; maximum shear travel as a result of 15-minute loading] and as the minimum value ["min"; shear travel ("residual deflection") 15 minutes after unloading; on unloading there is a backwards movement as a result of relaxation]. Likewise reported is the elastic component in percent ["elast"; elastic component=(max-min)·100/max].

TFT Test (Measurement Method H4):

Measurement of the flagging resistance to LV312 or TFT method (Threshold Flagging Time): For determining the flagging behaviour by the TFT method, a test is employed in which an additional flexural stress is generated by the application of the test specimens, prepared in a flat format, to a 1½ inch core. The combination of tensile load by a test weight and flexural stress causes flagging-like detachment of the adhesive tape starting from the bonded upper end, and ultimate failure by dropping of the test specimens (see FIG. 1, which also shows the schematic construction). The time in minutes before dropping occurs is the result. The critical parameters for the holding time of the test specimens are weight and temperature, the weight being selected such as to result in values of at least 100 minutes.

The cylindrically shaped test mandrel is a 1½ inch cardboard core with an external diameter of 42±2 mm, provided with a marking line 5 mm adjacent to the vertex line.

The adhesion base is the adhesive tape's own reverse face.

The manual roller has a weight of 2 kg.

The test weight is 1 kg.

The test conditions are 23±1° C. at 50±5% relative humidity, or 40° C. in a thermal cabinet.

Figure 2:
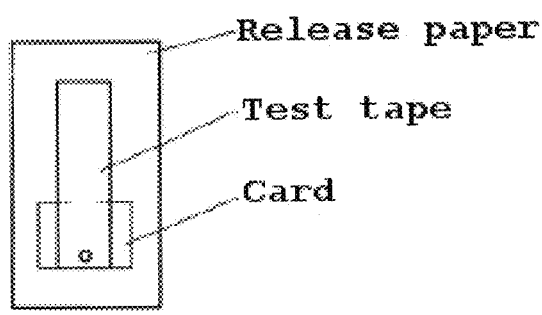
FIG. 2 shows a test tape.
Figure 3:
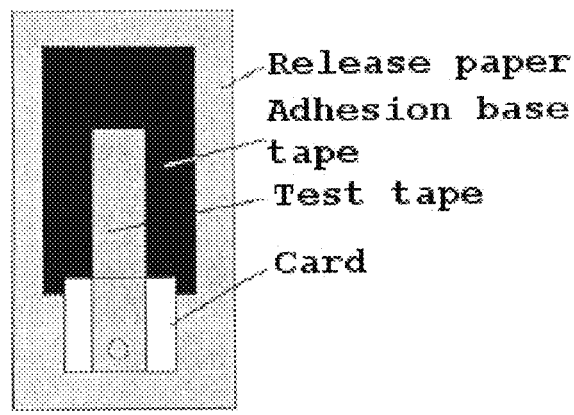
FIG. 3 shows a test strips individually bonded centrally to strips of the broader adhesion base.
Figure 4:
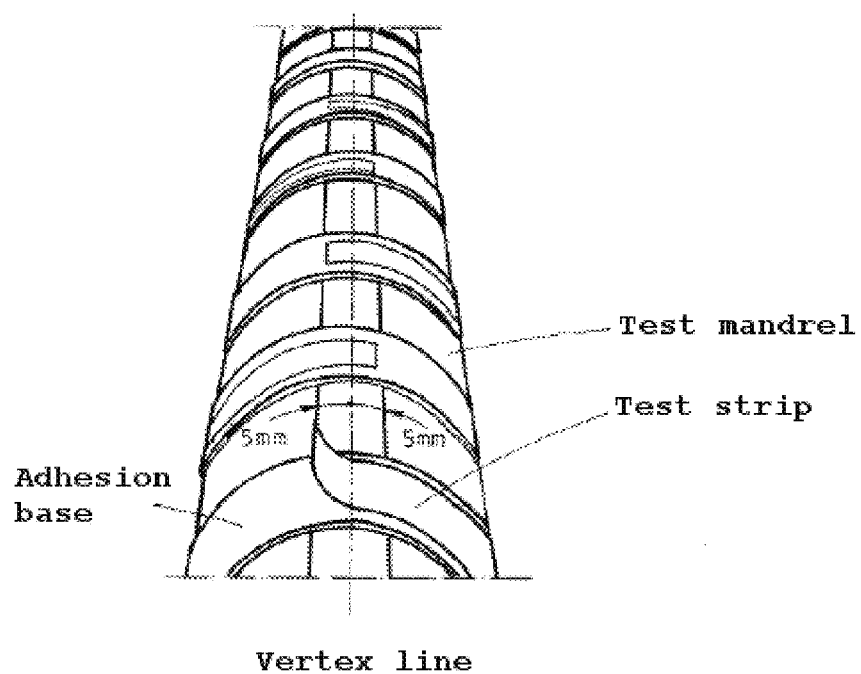
FIG. 4 shows the test strips together with adhesion base, are then adhered to the cardboard core

Testing is carried out on strips of adhesive tapes 19 mm wide. A strip with a length of 400 mm is adhered to release paper and cut to form three strips with a length of 100 mm each. It should be done using a fresh cutter blade. The reverse face must not be touched. A small piece of cardboard is adhered beneath one of the ends of each strip, and the assembly is perforated (see FIG. 2). The test strips are then individually bonded centrally to strips of the broader adhesion base (adhesive tape with a width 1½ times that of the adhesive tape under test), so that the small piece of cardboard still overlaps just (2 to 3 mm) at the end (see FIG. 3). The test specimens are rolled down using the 2 kg manual roller in 3 cycles at a speed of 10 m/min. The finished test specimens, i.e. the test strips together with adhesion base, are then adhered to the cardboard core in such a way that the top end of the test specimen overlaps the vertex point by 5 mm (see FIG. 4). In this operation, pressure must be applied only to the adhesion base, and not to the test specimen. The fully prepared test specimens are left in a controlled-climate chamber at 40° C. for 20±4 hours without weight loading.

Thereafter, weights with a mass of one kilogram are hung on, and the stopwatches are started. Measurement ends after failure of all three test specimens of one sample. The median of the three individual measurements is reported in minutes. The holding time is reported in minutes.

Commercially Available Chemicals Used

| Chemical compound | Trade name | Manufacturer | CAS No. |
|---|---|---|---|
| UV-crosslinkable polyacrylate | acResin ® A 260 UV | BASF | — |
| [2-Hydroxy-4-(octyloxy)-phenyl]methanone | Chimassorb ® 81 | BASF | 1843-05-5 |
| 2,2'-Methylenebis(6-(2H-benzotriazol-2-yl)-4-1,1,3,3-tetramethylbutyl)phenol) | Tinuvin ® 360 | BASF | 103597-45-1 |
| Bis(2,2,6,6-tetramethyl-4-piperidyl) sebacate | Tinuvin ® 770 | BASF | 52829-07-9 |
| Tri(nonylphenyl) phosphite | Irgafos ® TNPP | BASF | 26523-78-4 |

The PSA used in each of the following examples was acResin® A 260 UV, blended with UV stabilizers and/or ageing inhibitor. Comparative Example 1 uses no UV stabilizer and no ageing inhibitor, whereas Comparative Example 2 includes only an ageing inhibitor. In Comparative Example 7, a non-inventive ratio of UV stabilizer and photoinitiator is tested.

TABLE 1

Examples 1 to 7

| Ex. | UV stabilizer | $C_{stabilizer}/C_{photoinitiator}$ [1) | Ageing inhibitor |
|---|---|---|---|
| CE 1 | — | — | — |
| CE 2 | — | — | 0.3 wt. % Irgafos ® TNPP |
| 3 | 0.033 wt. % Chimassorb ® 81 | 0.02 | — |
| 4 | 0.066 wt. % Tinuvin ® 360 | 0.02 | — |
| 5 | 0.048 wt. % Tinuvin ® 770 | 0.02 | — |
| 6 | 0.048 wt. % Tinuvin ® 770 | 0.02 | 0.3 wt. % Irgafos ® TNPP |
| CE 7 | 1.91 wt. % Tinuvin ® 770 | 0.8 | — |

1) The ratio of stabilizer to initiator concentration in the photoinitiator is calculated on the basis of 0.005 mol of photoinitiator per 100 g of polyacrylate polymer.

AcResin® A 260 UV was applied (60 g/m²) to a carrier material (Hostaphan RN 36) and then crosslinked using UV light in a wavelength range from 200 to 400 nm (Eltosch, medium-pressure Hg lamp, 40 mJ/cm²). The crosslinking achieved was tested using measurement methods H1 to H4.

TABLE 2

Technical adhesive evaluation of Examples 1 to 7

| Example | BS steel [N/cm] | HP [min] | MST elast. comp. [%] | TFT [min] |
|---|---|---|---|---|
| 1 | 7.2 | 306 | 91 | 274 |
| 2 | 7.0 | 315 | 89 | 266 |
| 3 | 7.6 | 300 | 82 | 278 |
| 4 | 7.5 | 278 | 84 | 274 |
| 5 | 7.5 | 302 | 80 | 266 |
| 6 | 7.7 | 289 | 79 | 273 |
| 7 | 10 | 5 | 0 | 0 |

BS: bond strength, measured by method H1,
HP: holding power, measured by method H2,
MST: microshear test by method H3

It is clearly apparent that the UV crosslinking is disrupted as soon as the inventive ratio between the concentration of the UV stabilizer and the concentration of the photoinitiator is not fulfilled (Comparative Example 7). All other examples show a similar profile of properties and it can therefore be shown that small amounts of UV stabilizer do not excessively influence the crosslinking. The holding power times in Examples 1 to 6 can be considered to be similar within the margins of error. The bond strength to steel is slightly better and more constant for the inventive examples. On the basis of the microshear test, the inventive examples show that effective crosslinking was achieved with a high elastic component in the composition, in spite of the presence of the stabilizers, through UV crosslinking. From the results in Table 3 it can be shown that the technical adhesive properties remain very constant over broadly fluctuating UV radiation doses in the crosslinked compositions. Owing to the presence of UV stabilizers, therefore, the compositions of the invention exhibit more constant technical adhesive properties and permit a significantly more economic and more reproducible processing regime when the compositions of the invention are used.

The influence of the processing conditions was tested subsequently, with Examples 1 and 3 being irradiated at 35, 40 and 45 mJ/cm² in each case.

TABLE 3

Effect of the operational parameters on the technical adhesive properties

| Ex. | MST elast. comp. at 35 mJ/cm² [%] | MST elast. comp. at 40 mJ/cm² [%] | MST elast. comp. at 45 mJ/cm² [%] |
|---|---|---|---|
| 1 | 82 | 91 | 99 |
| 3 | 82 | 82 | 83 |

The invention claimed is:

1. A UV-crosslinkable and meltable pressure-sensitive adhesive composition comprising
    (i) mixtures of UV-crosslinkable polyacrylate polymers, selected from
        (i.a) mixtures of UV-crosslinkable polymers with at least one photoinitiator bonded covalently to the backbone of the polymers and
        (i.b) mixtures of UV-crosslinkable polyacrylate polymers, acrylate monomers and at least one photoinitiator, and
    (ii) at least one UV stabilizer which is present in the composition with a defined concentration which is harmonized with the concentration of the photoinitiator and is dependent on the ratio of the absorption maxima according to formulae 1 and 2 below, which are each applied subject to conditions I) and II):
    I) the wavelength of the absorption maximum of the UV stabilizer and of the photoinitiator are different by plus/minus less than 50 nm, $$0.01 \leq \frac{c_{UV-Stabilizer}}{c_{photoinitiator}} \leq 0.25, \quad (1)$$

where c is the concentration of the respective substance in mol/100 g polymer,
    II) the wavelength of the absorption maximum of the UV stabilizer and of the photoinitiator are different by plus/minus greater than or equal to 50 nm, $$0.05 \leq \frac{c_{UV-stabilizer}}{c_{photoinitiator}} \leq 0.55, \quad (2)$$

where c is the concentration of the respective substance in mol/100 g polymer.

2. The pressure-sensitive adhesive composition according to claim 1 wherein the UV stabilizer is selected from a UV absorber, UV inhibitor or mixtures comprising at least one UV absorber and one UV inhibitor.

3. The pressure-sensitive adhesive composition according to claim 1 comprising UV-crosslinkable polyacrylate polymers selected from:
   polymers of the esters of acrylic acid and/or of methacrylic acid;
   acrylate-based hybrid systems comprising polyester-polyether hybrid systems, polyester-polyether-based urethane acrylates and polyester-polyether-based esterified acrylates, and also
   copolymers of
      (a) monomeric acrylates or methacrylates or prepolymers of acrylates or methacrylates in each case independently with further
      (b) radically polymerizable monomers and/or prepolymers and/or polymers selected from:
      (b.1) acrylates selected from linear, branched and cyclic, alkyl-functionalized alkyl (meth)acrylates comprising 1 to 18 C atoms,
      (b.2) vinyl-substituted polymerizable monomers and/or prepolymers and/or polymers,
      (b.3) hydrocarbons having two olefinic double bonds,
      (b.4) monomers or prepolymers having at least one unsaturated, radically polymerizable group and at least one carboxylic, sulphonic or phosphonic acid group,
      (b.5) monomers or prepolymers having at least one unsaturated, radically polymerizable group and at least one hydroxyl group,
      (b.6) monomers or prepolymers having at least one unsaturated, radically polymerizable group and at least one other functional group selected from isocyanate, amino, amide, ether, polyether and glycidyl groups,
      with selection as (b), in each case independently, of one or more radically polymerizable monomers, prepolymers or polymers or mixtures thereof.

4. The pressure-sensitive adhesive composition according to claim 3, characterized by UV-crosslinkable polyacrylate polymers comprising copolymers of (a) monomeric acrylates or methacrylates or prepolymers of acrylates or methacrylates, in each case independently, with other (b.1) acrylates selected from linear, branched or cyclic, alkyl-functionalized alkyl (meth)acrylates comprising 1 to 18 C atoms, the polyacrylate being based, to an extent of greater than or equal to 40 wt. % to 100 wt. % of the polyacrylate, on alkyl-functionalized alkyl (meth)acrylates comprising 1 to 18 C atoms.

5. The pressure-sensitive adhesive composition according to claim 3 the UV-crosslinkable copolymers derive from
   (a) esters of monomeric acrylates or methacrylates or prepolymers of acrylate esters or methacrylate esters and, in each case independently,
   (b) at least one or more other radically polymerizable monomers and/or prepolymers and/or polymers selected from (b.1) to (b.6).

6. The pressure-sensitive adhesive composition according to claim 1 wherein the UV stabilizers are selected from organic UV absorbers which on induction by UV radiation form tautomeric structures, or inorganic UV absorbers, and radical scavengers as UV inhibitors.

7. The pressure-sensitive adhesive composition according to claim 2 wherein
   the organic UV absorbers comprise 2-hydroxyphenyl derivatives, oxalanilide
      derivatives, acrylic acid derivatives with aromatic substitution at C-3, organic nickel complexes or umbelliferone,
   the inorganic UV absorbers comprise metal oxides, and
   the UV inhibitors comprise alkyl-substituted hindered amines.

8. The pressure-sensitive adhesive composition according to claim 2 wherein
   the organic UV absorbers comprise, as 2-hydroxyphenyl derivatives, 2-(2-hydroxyphenyl)-2H-benzotriazoles (formula IIa), (2-hydroxyphenyl)-s-triazines (formula IIb), hydroxybenzophenones (formula IIc) and oxalanilides (formula IId),

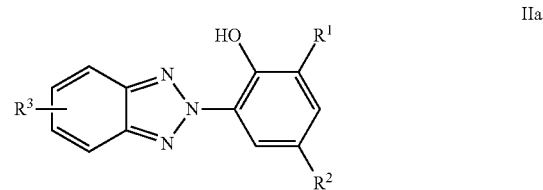

IIa

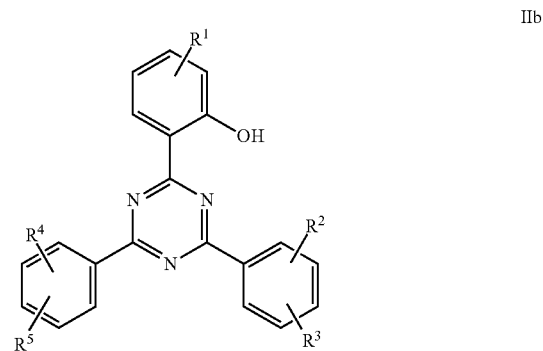

IIb

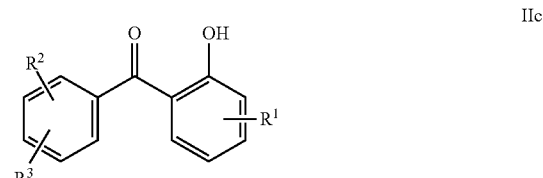

IIc

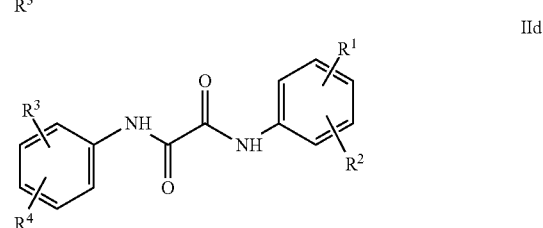

IId where $R^1$, $R^2$ $R^3$, $R^4$ and $R^5$ in each case independently of one another correspond to a hydrogen atom or to an alkyl group,
the acrylic acid derivatives with aromatic substitution at C-3 comprise phenyl-substituted cinnamic acid derivatives and urocanic acid,
the inorganic UV absorbers comprise, as metal oxides, titanium dioxide, iron oxide or zinc oxide, and the UV inhibitors, as alkyl-substituted hindered amines, comprise 2,2,6,6-alkyl-substituted piperidine derivatives.

9. The pressure-sensitive adhesive composition according to claim 3 wherein the composition comprises less than or equal to 2 parts by weight to 0.0001 part by weight of an organic solvent and/or water, based on 100 parts by weight of polyacrylate.

10. The pressure-sensitive adhesive composition according to claim 1 wherein
the at least one photoinitiator which is present in the mixture according to
(i.a) which is selected from acetophenone, benzoin ethers, benzyl dialkyl ketols, benzophenone, benzil, thioxanthone, phenylglyoxylate, benzoylphosphinate, benzoylphosphine oxide, bisbenzoylphosphine oxide, α-amino ketone or derivatives thereof, or titanocene, bis[η$^5$-2,4-cyclopentadien-1-yl)bis[2,6-difluoro-3-(1H-pyrrol-1-yl)phenyl]titanium, oxime esters, [1-(4-phenylsulphanylbenzoyl)heptylidene-amino]benzoate and [1-[9-ethyl-6-(2-methylbenzoyl)carbazol-3-yl]ethylideneamino]acetate and derivatives thereof, or
the at least one photoinitiator which is bonded covalently to the polymer backbone according to (i.b) is copolymerized into the polymer backbone by radical copolymerization of an ethylenically substituted linker-photoinitiator group, the photoinitiator group comprising a radical derived from acetophenone, benzoin ethers, benzyl dialkyl ketols, benzophenone, benzil, thioxanthone, phenylglyoxylate, benzoylphosphinate, benzoylphosphine oxide, bisbenzoylphosphine oxide, a-amino ketone or derivatives thereof, or titanocene, bis[η-2,4-cyclopentadien-1-yl)bis[2,6-difluoro-3-(1H-pyrrol-1-yl)phenyl]titanium, oxime esters, [1-(4-phenylsulphanylbenzoyl)heptyl-ideneamino]benzoate and [1-[9-ethyl-6-(2-methylbenzoyl)carbazol-3-yl]ethylideneamino]acetate and derivatives thereof.

11. The pressure-sensitive adhesive composition according to claim 1 wherein the composition comprises, in each case independently, per 100 parts by weight of polyacrylate
0.0001 to 1 mol of photoinitiator per 100 parts by weight of polyacrylate,
0 to 2 parts by weight of solvent,
0.05 to 5 parts by weight of primary and/or secondary ageing inhibitors having a molecular weight of less than or equal to 1500 g/mol, polymeric ageing inhibitors comprising hydroxyl groups and optionally ether groups or having at least one phosphite group, and
0 to 80 parts by weight of tackifier resins.

12. The pressure-sensitive adhesive composition according to claim 1 wherein the K value of the polyacrylate is greater than or equal to 30 to 80, measured as a one per cent strength (1 g/100 mL) toluenic polymer solution at 25° C.

13. The pressure-sensitive adhesive composition according to claim 1 wherein the static glass transition temperature (Tg) of the polyacrylate is greater than or equal to −60 to +10° C.

14. A method for producing a composition according to claim 1, said method comprising the mixing of
(i) mixtures of UV-crosslinkable polyacrylate polymers, selected from
(i.a) mixtures of UV-crosslinkable polymers with at least one photoinitiator bonded covalently to the backbone of the polymers and
(i.b) mixtures of UV-crosslinkable polyacrylate polymers, acrylate monomers and at least one photoinitiator, with
(ii) at least one UV stabilizer wherein the at least one UV stabilizer is used with a defined concentration which is harmonized with the concentration of the photoinitiator and is dependent on the ratio of the absorption maxima according to formulae 1 and 2 below, which are each applied subject to conditions I) and II):
I) the wavelength of the absorption maximum of the UV stabilizer and of the photoinitiator are different by plus/minus less than 50 nm, $$0.01 \leq \frac{c_{UV-Stabilizer}}{c_{photoinitiator}} \leq 0.25, \quad (1)$$

where c is the concentration of the respective substance in mol/100 g polymer,
II) the wavelength of the absorption maximum of the UV stabilizer and of the photoinitiator are different by plus/minus greater than or equal to 50 nm, $$0.05 \leq \frac{c_{UV-stabilizer}}{c_{photoinitiator}} \leq 0.55, \quad (2)$$

where c is the concentration of the respective substance in mol/100 g polymer.

15. The method according to claim 14,
wherein the UV-crosslinkable polyacrylate polymers are selected from
(a) polymers of the esters of acrylic acid and/or of methacrylic acid,
(b) acrylate-based hybrid systems, comprising polyester-polyether hybrids, polyester-polyether-based urethane acrylates and polyester-polyether-based esterified acrylates, and also copolymers of (a) and (b).

16. A method for preparing a bonding agent, a transfer adhesive, an adhesive transfer tape or a coated carrier comprising providing the the meltable pressure-sensitive adhesive composition of claim 1, as a melt in the temperature range from 60 to 200° C.,
applying the composition in the form of a uniform coating with a film thickness of 2 to 200 μm, and
the coating being crosslinked using high-energy radiation having a radiation energy of 10 to 150 mJ/cm$^2$.

17. A bonding agent obtained by the method according to claim 16.

* * * * *